United States Patent
Ushioda et al.

(10) Patent No.: US 7,025,802 B2
(45) Date of Patent: Apr. 11, 2006

(54) FILTER CONTROL METHOD, AND FILTER CONTROLLED BY THE METHOD

(75) Inventors: Kazuya Ushioda, Hyogo-ken (JP); Yoshiyuki Doi, Hyogo-ken (JP); Toyosei Aota, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 201 days.

(21) Appl. No.: 10/415,099

(22) PCT Filed: Jun. 6, 2002

(86) PCT No.: PCT/JP02/05599

§ 371 (c)(1),
(2), (4) Date: Apr. 30, 2003

(87) PCT Pub. No.: WO02/101616

PCT Pub. Date: Dec. 19, 2002

(65) Prior Publication Data

US 2004/0011713 A1   Jan. 22, 2004

(30) Foreign Application Priority Data

Jun. 8, 2001   (JP)   ............................. 2001-173735

(51) Int. Cl.
*B01D 46/42* (2006.01)

(52) U.S. Cl. .................. 95/25; 95/26; 95/278; 96/417; 705/1

(58) Field of Classification Search .................. 210/85, 210/91, 106–108, 138–140, 143, 321.69, 210/409–411, 636, 739, 791–798; 95/1, 95/25, 26, 19, 278; 96/414, 417, 423–428; 705/1; 700/273
See application file for complete search history.

(56) References Cited

U.S. PATENT DOCUMENTS

| | | | | |
|---|---|---|---|---|
| 3,826,369 A | * | 7/1974 | Murata et al. | ............... 210/798 |
| 4,394,262 A | * | 7/1983 | Bukowski et al. | .......... 210/103 |
| 5,674,381 A | * | 10/1997 | Den Dekker | ................ 210/85 |
| 6,009,404 A | * | 12/1999 | Eimer | ........................... 705/7 |

(Continued)

FOREIGN PATENT DOCUMENTS

JP   7-213479   8/1995

(Continued)

OTHER PUBLICATIONS

"Chubu Kohan enters medical waste disposal business. Also cellar grease filter rental business . . . " The Nikkan Kogyo Shinbun, LTD., p. 15 Feb. 5, 1991.

*Primary Examiner*—Joseph Drodge
(74) *Attorney, Agent, or Firm*—Oblon, Spivak, McClelland, Maier & Neustadt, P.C.

(57) ABSTRACT

A filter maintenance monitoring method and a filter maintained thereby are provided, by which re-use of the filter by wash is smoothly and efficiently promoted. The filter includes that loaned from a filter owner to a filter user. The filter used for a predetermined purpose and having clogging of filter cloth by filtering dust in air is recovered to be washed for re-use. History data base stored in a storage portion of a computer is renewed based on wash history of the recovered filter. Then, re-use of the filter is decided based on the renewed history data base. Changes in the filter by damages or deterioration corresponding to the wash history are automatically grasped. Thereby, an efficient filter maintenance is realized.

2 Claims, 2 Drawing Sheets

U.S. PATENT DOCUMENTS

| | | | |
|---|---|---|---|
| 6,394,113 B1 * | 5/2002 | Hatanaka et al. | 134/184 |
| 6,558,444 B1 * | 5/2003 | Hunter | 55/385.1 |
| 6,568,436 B1 * | 5/2003 | Matthews et al. | 141/65 |
| 6,584,768 B1 * | 7/2003 | Hecker et al. | 60/297 |
| 6,673,136 B1 * | 1/2004 | Gillingham et al. | 95/273 |

FOREIGN PATENT DOCUMENTS

| | | |
|---|---|---|
| JP | 11-312224 | 11/1999 |
| JP | 2000-35994 | 2/2000 |

* cited by examiner

(12) United States Patent

FILTER CONTROL METHOD, AND FILTER CONTROLLED BY THE METHOD

TECHNICAL FIELD

The present invention relates to a filter maintenance monitoring method, the filter being of a type filtering a large amount of air, such as gas turbine intake air, the filter further including such one as used by a filter user on lease from a filter owner. Also, the present invention relates to a filter maintained by this method.

BACKGROUND OF THE INVENTION

A gas turbine that is used in a thermal power station, etc. comprises an air intake portion, a compressor, a combustor and a turbine portion. Air is taken in from the air intake portion and is supplied into the compressor to be compressed to become compressed air. The compressed air is sent to the combustor, where the compressed air and fuel are mixed together to be continuously used for combustion. High temperature and high pressure combustion gas is generated by the combustion and this combustion gas is supplied into the turbine portion.

By passing of the combustion gas, moving blades of the turbine portion are driven and a rotor integrated with the moving blades is rotated. Thereby, a generator connected to the rotor is driven and generates electric power.

If foreign matters, such as dust, are included in the air supplied into the compressor, the foreign matters stick to the blades of the compressor to thereby reduce the compression efficiency. Thus, in order to remove the foreign matters, filtering of the air is carried out by a filter in the air intake portion. Generally, the filter comprises a frame, made of metal material or the like, and a filter cloth fitted to the frame.

If the filter is used for a long time, clogging of the filter cloth occurs to thereby invite an increase of pressure loss. Thus, a periodical replacement of the filter is needed. Usually, the filter is replaced in the frequency of once per 3 to 12 months and the filter after used is disposed as industrial waste.

Also, as the gas turbine consumes a large amount of air, a multiplicity of filters are needed. For example, in a usual gas turbine, 1000 or more filters, each having an opening area of 0.35 m² or so, are used, or in a larger gas turbine, some 5000 filters are used.

Thus, on each occasion of the replacement of the filter, an extremely large amount of industrial waste arises and this causes problems from the viewpoint of the environment preservation and resource saving. Also, replacement of the multiplicity of filters invites a large increase of running cost of the gas turbine power generation plant.

In view of the abovementioned problems, trials are recently being carried out for re-using the used filters by washing them. While various methods for washing the used filters are proposed and being studied, one of them makes use of an ultrasonic washer.

In performing the wash by the ultrasonic washer, the used filters are dipped in wash liquid. By the ultrasonic wave, cavitations are generated in the wash liquid. By the impact force caused when the cavitations disappear, the dust sticking to the filter cloth is removed.

By this wash, the filter returns to the state of pressure loss as if it is almost a new filter. The washed filter is mounted on the gas turbine to be re-used for a predetermined period and is then washed again.

As mentioned above, the use and wash of the filter are repeated alternately for several times. This is what is called a recycle use of products and thereby both of suppression of industrial waste and cost reduction can be realized.

In the mentioned wash process, however, there are often caused a damage of the elements, such as filter cloths, and a breakage of connection portions of the elements by fluid pressure of the wash liquid or the like. Hence, re-use of all of the filters sent for the wash is difficult and a process loss must be estimated to some extent.

Also, if not a breakage, deterioration of the elements occurs due to the repeated washes and this invites a gradual lowering of the filter performance.

Thus, there is a limitation in the number of times of the wash, that is, the number of times of the re-use, and it is preferable to monitor the maintenance or past history, such as the number of times of wash, for each of the filters.

In the usual maintenance monitoring mode of the filters of this kind, a person or company (for example, a power company) who owns the gas turbine for his own business buys and owns the filters therefor and performs the operation and maintenance by himself based on his own operation standard or the like. That is, the owner of the gas turbine sends the filters to be washed for re-use after the filters have been once used for operation of his own gas turbine.

But, as mentioned above, there is the loss in the wash process and not all of the filters can be re-used. Hence, the filters corresponding to the lost filters must be supplemented.

Also, from the viewpoint of a stable operation of the gas turbine, the owner of the gas turbine must continuously have the supplemental filters in a sufficient quantity, which is a large burden on the owner. Further, if seen in the electric power industry only, there are many gas turbine owners, and if many supplemental filters are to be owned by each of the owners, it will be quite inefficient as the whole industry. Moreover, such inconvenience may lead to an obstruction in promoting the re-use of filters by wash.

Therefore, as one of filter maintenance monitoring modes, such one will be necessary to be considered that a gas turbine owner and a filter owner are separated from each other, wherein the former will be the user of the filter loaned from the latter, such as on a lease arrangement, and the latter will be the monitor of the filter maintenance, or such mode is considered that there exists what is called a leasing company inbetween in the abovementioned mode.

DISCLOSURE OF THE INVENTION

In view of the present status as mentioned above, it is an object of the present invention to provide a filter maintenance monitoring method and a filter maintained by this method by which the various problems existing in the present status are solved and a filter re-use can be smoothly and effectively promoted by washing the filter.

In order to achieve the abovementioned object, the first one of the present invention provides a filter maintenance monitoring method, characterized in comprising the steps of renewing a history data base stored in a storage portion of a computer based on a wash history of a filter recovered after a predetermined use to be washed for re-use and judging a decision for re-use of the filter based on the history data base.

That is, according to the present first invention, when the filter, after used for the predetermined use and having clogging of the filter cloth, etc. by foreign matters in the air, is recovered to be washed for re-use, the history date base stored in the storage portion of the computer is renewed based on the wash history of the filter and the decision for re-use of the filter is done based on this renewed history data base. Thereby, the changes in the filter, that is damaged or deteriorated by the progress of the wash history, can be automatically grasped and an effective filter maintenance becomes possible.

Also, the second one of the present invention provides a filter maintenance monitoring method as mentioned in the first invention, characterized in that the recovery of the filter is done after the predetermined use by a filter user using the filter on lease from a filter owner.

That is, according to the present second invention, the filter owned by the filter owner (in case of the gas turbine filter, for example, the filter owner is a gas turbine manufacturer, a filter manufacturer, a person entrusted to own the filter or the like) is loaned to the filter user (in case of the gas turbine filter, for example, the filter user is a power company or the like) on a lease arrangement, etc. and, after the predetermined use by the filter user, the filter is recovered by the filter owner, etc. for re-use.

The washed filter is again loaned to the same user or a different user. In this series of processes, the filter can be centrally maintained by the filter owner and the filter to be supplemented for the loss caused in the wash can be held only by the filter owner. Thus, the filter user can use the filter without having a risk of the loss.

Also, the filter owner can grasp the history (the number of washes, contents of the wash, etc.) of each of the filters based on the history data base and the decision for re-use of the filter can be done based on this history data base. For example, only the filter of which the number of washes does not reach a predetermined number is sent for the wash and the filter of which the number of washes reaches the predetermined number is abandoned. Thereby, an efficient and rationalized maintenance of the filter becomes possible.

Also, the third one of the present invention provides a filter maintenance monitoring method as mentioned in the first or the second invention, characterized in that the decision is automatically done by a computing means of the computer based on a predetermined filter re-using standard.

That is, according to the present third invention, the decision in the first or the second invention is automatically done by the computing means of the computer based on the predetermined filter re-using standard. Thereby, an exact, efficient and rationalized decision can be obtained.

Also, the fourth one of the present invention provides a filter maintenance monitoring method as mentioned in any one of the first to the third inventions, characterized in that the filter is individually attached with an identification object and the history data base is constructed corresponding to information given by the identification object.

That is, according to the present fourth invention, each of the filters is attached with the identification object that contains the information of that filter and the history data base is constructed corresponding to this information. Thereby, a maintenance of each of the filters can be easily ensured.

Also, the fifth one of the present invention provides a filter maintenance monitoring method as mentioned in the fourth invention, characterized in that the identification object comprises a coded information.

That is, according to the present fifth invention, the identification object comprises the coded information. As the coded information, for example, a bar code, a two dimensional code, a code having color information added to the bar code or the two dimensional code, etc. may be selected. By using the coded information, the identification of the filter can be done very easily by a code reader (a bar code reader, for example).

Also, the sixth one of the present invention provides a filter maintenance monitoring method as mentioned in any one of the first to the fifth inventions, characterized in that the history data base includes wash history data and repair history data.

That is, according to the present sixth invention, the history data base includes not only the wash history data but also the repair history data. Thereby, in the maintenance of the filter, both of the wash history data and the repair history data are considered and the decision for re-use of the filter can be done more securely.

Also, the seventh one of the present invention provides a filter maintenance monitoring method as mentioned in any one of the first to the sixth inventions, characterized in that the filter is a gas turbine intake air filter.

That is, according to the present seventh invention, the filter maintained by the filter maintenance monitoring method of any one of the first to the sixth inventions is the gas turbine intake air filter, so that the intake air to be supplied into the gas turbine is filtered by the filter of which maintenance is appropriately monitored. Thereby, the foreign matters in the air are efficiently removed and operation of the gas turbine can be ensured.

Also, the eighth one of the present invention provides a filter maintenance monitoring method as mentioned in any one of the first to the seventh inventions, characterized in that the wash history of the filter is a recycle history of a gas turbine intake air filter.

That is, according to the present eighth invention, the filter, if still usable after the predetermined use, is recovered for wash and the wash history of the washed filter as what is called a recycle history of the filter is reflected in the appropriate maintenance of re-use of the gas turbine intake air filter.

Also, the ninth one of the present invention provides a filter maintained and used by the filter maintenance monitoring method as mentioned in any one of the first to the eighth inventions.

That is, the filter according to the present ninth invention is appropriately maintained by any one of the first to the eighth inventions. Thereby, the wash of this filter is done corresponding to the predetermined situations of use and removal of the foreign matters in the air can be done efficiently.

Finally, the tenth one of the present invention provides a filter maintained and used as a gas turbine intake air filter by the filter maintenance monitoring method as mentioned in any one of the first to the eighth inventions.

That is, the filter according to the present tenth invention is used as the gas turbine intake air filter and is appropriately maintained by any one of the first to the eighth inventions. Thereby, the wash of this filter is done corresponding to the predetermined situations of use. Thus, removal of the foreign matters in the air can be efficiently done so as to contribute to the efficient operation of the gas turbine.

BEST MODE FOR CARRYING OUT THE INVENTION

Figure 1:
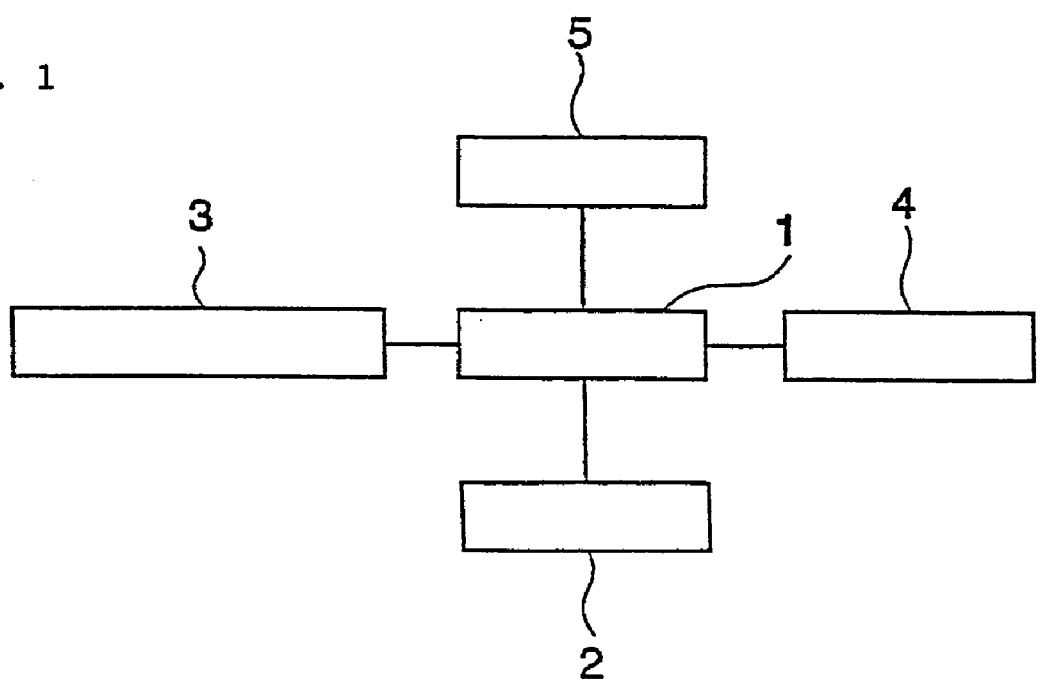
FIG. 1 is a conceptual view explaining one embodiment of a filter maintenance monitoring method according to the present invention.
Figure 2:
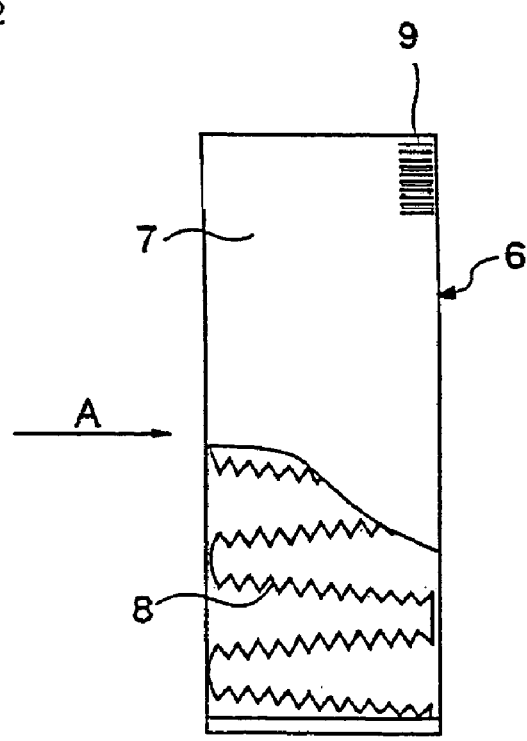
FIG. 2 is a partially cut out side view of one example of a filter maintained by the monitoring method of FIG. 1.
Figure 3:
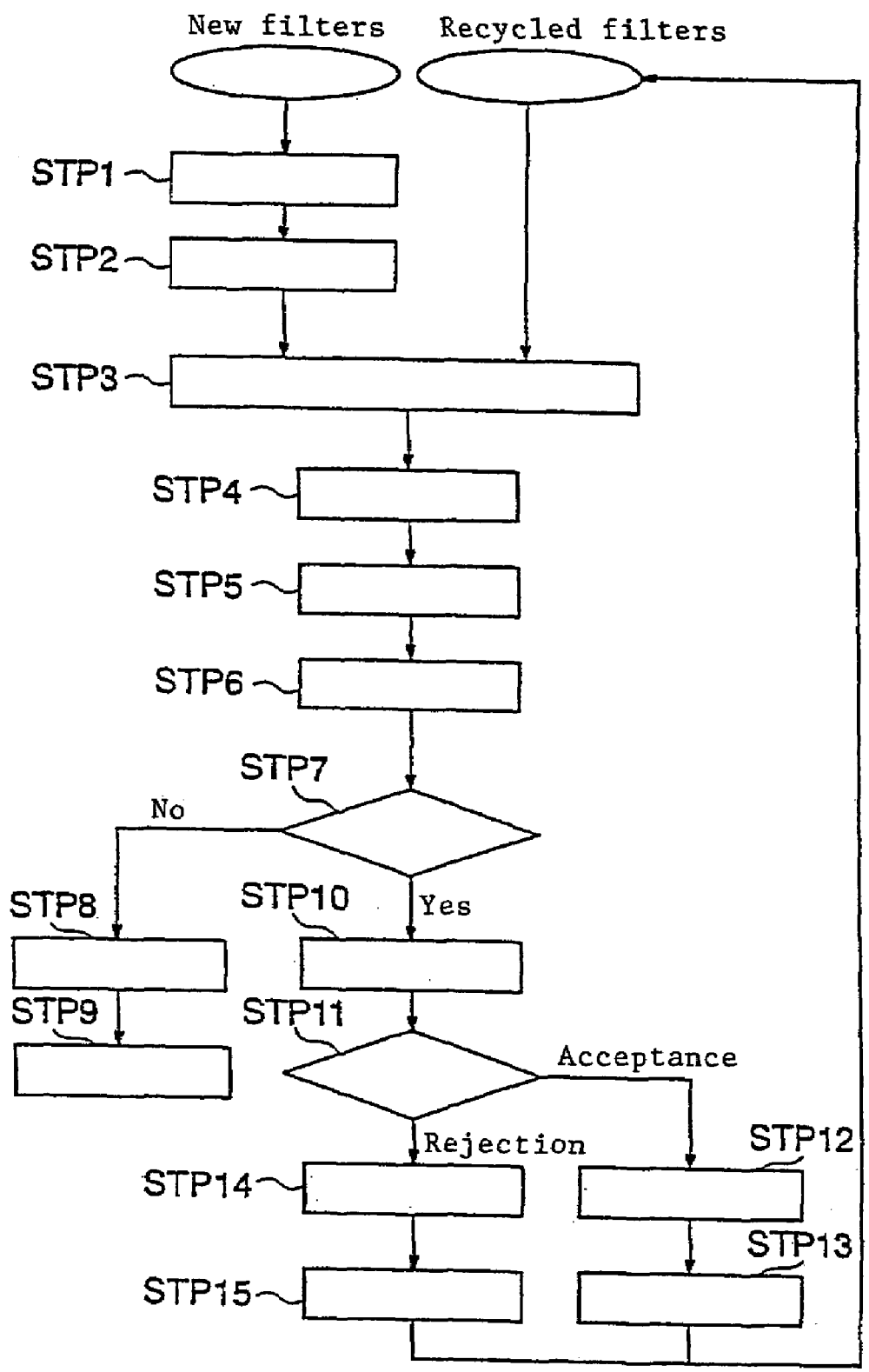
FIG. 3 is a flow diagram explaining one example of flow of filters used on lease and maintained by the monitoring method of FIG. 1.

The invention will be more concretely described based on one embodiment with reference to FIGS. 1 to 3.

FIG. 1 is a conceptual view explaining one embodiment according to the method of the present invention, FIG. 2 is a partially cut out side view of a filter maintained by the method of FIG. 1 and FIG. 3 is a flow diagram explaining one example of flow of filters used on lease and maintained by the method of FIG. 1.

In the present embodiment, the monitoring system for the filter maintenance comprises a CPU (computer) 1 as a computing means, a keyboard 2 as an inputting means, a bar code reader 3 as another inputting means, a storage portion 4 constructed by a hard disc, etc. and a monitor 5.

The storage portion 4 stores a data base in which a wash history of each of the filters is recorded. In place of the keyboard 2, an inputting means of an audio inputting device, a pen inputting device or the like may be used. Also, in place of the bar code system, a reader for other identification systems may be used.

A filter 6 used in the present monitoring system and shown in FIG. 2 as an example comprises a frame 7 and a filter cloth 8 fitted in the frame 7. The frame 7 is made of stainless steel, for example. The filter cloth 8 is made of a non-woven fabric of synthetic resin, for example. In the direction shown by arrow A in FIG. 2, air flows into the filter 6 to pass therethrough. At this time, dust in the air is collected by the filter cloth 8.

In the present embodiment, the filter 6, after used for the predetermined purpose to collect the dust in the air, is recovered and washed to be re-used. The basic flow of the process will be described based on an example of the mode where the filter 6 is used on lease, as schematically shown in FIG. 3.

In FIG. 3, as STP1, where STP means a step, new filters 6 of a given number are prepared by a filter owner and a bar code 9, as shown in FIG. 2, is attached to the outer surface of the frame 7 of each of the filters 6. The bar code 9 is an identification code for identifying that filter 6 out of the different identification codes for the respective filters 6.

Next, as STP2, all the identification codes of the prepared filters 6 are inputted into the CPU1 from the keyboard 2. Then, the CPU1 produces a record of each of the identification codes and renews the data base stored in the storage portion 4. Thereby, the initial registration of the new filters 6 is completed.

Then, as STP3, the filters 6 are shipped to one or more of filter users for use on lease. Together with the new filters 6, recycled filters 6 may be shipped. The recycled filters are those re-produced by wash or repair as will be described below. The leased filters 6 are installed on the air intake portion of a gas turbine and the gas turbine is operated. That is, as STP4, the filters 6 are used by the filter users.

As the filters 6 are used, clogging of the filters 6 gradually progresses. As STP5, the filters 6 are removed after a predetermined operation of the gas turbine to be recovered by the filter owner. The recovered filters 6 are sent to a wash factory where a washing machine is installed. Usually, the filters 6 used by a plurality of the filter users are collected at the wash factory of one place.

In the wash factory, as STP6, the bar code 9 of each of the recovered filters 6 is read by the bar code reader 3. By the readout data, the CPU1 identifies the respective filters 6, so that the past wash history (the number of washes, etc.) is taken out of the data base stored in the storage portion of the CPU1.

Then, as STP7, a decision is judged as to whether the filter 6 is to be further washed or not. The steps to judge this decision is automatically proceeded by computation in the CPU1 based on a previously set standard for re-using the filter. For example, if the number of the past washes does not reach a predetermined number, "Yes" is decided for the wash for re-use. If the number of the past washes reaches the predetermined number, "No" is decided. The result of the decision is displayed on the monitor 5.

As a matter of course, the result of the decision may be put out into a printer or the like that is separately provided (not shown). Also, the result of the decision may be audibly announced by different tones. It is to be noted that the decision of a further wash is preferably to be made not only by the past wash history but also in consideration of the repair history, as will be described below.

As STP8, the record corresponding to the filter 6 that is decided not to be re-used by the "No" decision in the STP7 is removed from the data base. Then, as STP9, this filter 6 is abandoned.

Incidentally, for example, even if the filter cloth 8 is used to its life and the filter 6 is decided not to be re-used, there is still a case where the frame 7 can be re-used. In this case, the filter cloth 8 only is replaced with a new one and this is recorded in the data base as repair history data from the keyboard 2, for example.

That is, in this data base, not only the data of the wash history but also the data of the repair history are recorded. The repair history data also are used as information for judging the decision of wash at the next time of recovery.

On the other hand, the filters 6 decided as "Yes" for a further wash in the STP7 are washed, as STP10. An ultrasonic wave washer is preferably used for this wash. The washed filters 6 are inspected, as STP11.

For each of the filter 6 accepted by the inspection, the bar code 9 is read, as STP12, and the data base is renewed accordingly, as STP13. This renewal is done by the process to add 1 to the number of the past washes of the corresponding filter 6.

The filters 6 thus accepted by the inspection are re-used as recycled filters. The filter user re-using the recycled filters may be the same original filter user or may be a different user.

The filters 6 rejected in the inspection of the STP11 are repaired, as STP14. As mentioned above, for example, if the filter cloth 8 is damaged by fluid pressure of the wash liquid, the filter cloth 8 is replaced.

As STP15, the data of this repair are recorded in the data base from the keyboard 2, for example. These repair history data also are used as information for judging the decision of wash at the next time of recovery. The repaired filters 6 are re-used as recycled filters.

In the monitoring system of the present embodiment as mentioned above, the wash history and the repair history of each of the filters 6 are monitored by the computer. Hence, the decision of re-use after the filter 6 is recovered can be done easily and securely.

The history monitoring system for recycling the gas turbine intake air filters is not limited to the mode described above. For example, after the bar code 9 is read, if the past wash history and repair history are displayed on the monitor 5, an operator may judge the decision of re-use based on the display. Also, if an non-coded identification object is attached to the filter 6, the identification object may be visually read and inputted from the keyboard 2, etc. Further, the computer unit and the bar code reader 3 may be located separately from each other and in this case, these units are connected to each other with wire or without wire.

In the filter leasing system using the present monitoring system, the filters 6 after used may be centrally maintained by the filter owner (or a person entrusted to do so). Hence, it will be enough if the filter owner only prepares the filters 6 and parts thereof for supplementing the loss caused by the wash. Thus, there is no need for the respective filter users to have supplemental filters or parts and the efficiency is enhanced as the whole industry. Also, the filter owner who has recovered the filters 6 used for the full life can recover the still usable parts for re-use. Thereby, a further resource saving can be realized.

For example, in the abovementioned embodiment, while the example where the filters are installed on the gas turbine air intake portion, the use of the filters is not limited to the combination with the gas turbine but a use in an air supply device in an internal combustion engine, a combustion equipment of a boiler, etc. or other machinery using air is considered.

Also, for the convenience of description, while the example of the filter owner and the filter user being separate parties connected by a lease relationship has been described, the parties may be a filter maintenance monitoring person and a filter operating person in the same one organization or enterprise.

INDUSTRIAL APPLICABILITY

In the first one of the present invention as claimed in Claim 1, the filter maintenance monitoring method comprises the steps of renewing a history data base stored in a storage portion of a computer based on a wash history of a filter recovered after a predetermined use to be washed for re-use and judging a decision for re-use of the filter based on the history data base.

That is, when the filter, after the predetermined use, is recovered to be washed, the history date base stored in the computer storage portion is renewed based on the wash history and the decision for re-use of the filter is done based on this renewed history data base. Thus, the changes in the filter, that is damaged or deteriorated by the progress of the wash history, can be automatically grasped and an effective filter maintenance becomes possible, thereby realizing a cost reduction and a contribution to the global environment preservation and resource saving.

According to the second one of the present invention as claimed in Claim 2, in the filter maintenance monitoring method as mentioned in the first invention, the recovery of the filter is done after the predetermined use by a filter user using the filter on lease from a filter owner.

That is, the filter owned by the filter owner is loaned to the filter user on a lease arrangement, etc. and, after the predetermined use by the filter user, the filter is recovered by the filter owner, etc. to be washed for re-use.

The washed filter is again loaned to the same user or a different user. In this series of processes, the filter can be centrally maintained by the filter owner and the filter to be supplemented for the loss caused in the wash can be held only by the filter owner. Hence, the filter user can use the filter without having a risk of the loss, thereby realizing a cost reduction and a contribution to the global environment preservation and resource saving.

According to a third invention embodiment, in the filter maintenance monitoring method as mentioned in the first or the second invention, the decision is automatically done by a computing means of the computer based on a predetermined filter re-using standard.

That is, the decision in the first or the second invention is automatically done by the computing means of the computer based on the predetermined filter re-using standard. Hence, an exact, efficient and rationalized decision can be obtained, thereby realizing a cost reduction and a contribution to the global environment preservation and resource saving.

According to a fourth invention embodiment, in the filter maintenance monitoring method as mentioned in any one of the first to the third inventions, the filter is individually attached with an identification object and the history data base is constructed corresponding to information given by the identification object.

That is, each of the filters is attached with the identification object that contains the information of that filter and the history data base is constructed corresponding to this information. Hence, a maintenance of each of the filters can be easily ensured, thereby realizing a cost reduction and a contribution to the global environment preservation and resource saving.

According to a fifth invention embodiment, in the filter maintenance monitoring method as mentioned in the fourth invention, the identification object comprises a coded information. That is, the coded information of the identification object is a bar code, a two dimensional code, a code having color information added to the bar code or the two dimensional code, etc. By using a bar code reader, for example, the identification of the filter can be done very easily by a code reader, thereby realizing a cost reduction and a contribution to the global environment preservation and resource saving.

According to a sixth invention embodiment, in the filter maintenance monitoring method as mentioned in any one of the first to the fifth inventions, the history data base includes wash history data and repair history data. That is, in the maintenance of the filter, both of the wash history data and the repair history data are considered and the decision for re-use of the filter can be done more securely, thereby realizing a cost reduction and a contribution to the global environment preservation and resource saving.

According to a third invention embodiment, in the filter maintenance monitoring method as mentioned in any one of the first to the sixth inventions, the filter is a gas turbine intake air filter. That is, in the filter being the gas turbine intake air filter, the intake air to be supplied into the gas turbine is filtered by the filter of which maintenance is appropriately monitored. Hence, the foreign matters in the air are efficiently removed and operation of the gas turbine can be ensured, thereby realizing a cost reduction and a contribution to the global environment preservation and resource saving.

According to a eighth invention embodiment in the filter maintenance monitoring method as mentioned in any one of the first to the seventh inventions, the wash history of the filter is a recycle history of a gas turbine intake air filter. That is, the filter, if still usable after the predetermined use, is recovered for wash and the wash history of the washed filter as what is called a recycle history of the filter is reflected in the appropriate maintenance of re-use of the gas turbine intake air filter, thereby realizing a cost reduction and a contribution to the global environment preservation and resource saving.

According to a ninth invention embodiment, the filter is maintained and used by the filter maintenance monitoring, method as mentioned in any one of the first to the eighth inventions. That is, by the filter being appropriately maintained by any one of the first to the eighth inventions, the wash of this filter is done corresponding to the predetermined situations of use and removal of the foreign matters in the air can be done efficiently, thereby realizing a cost reduction and a contribution to the global environment preservation and resource saving.

Finally, according to a tenth invention embodiment, the filter is maintained and used as a gas turbine intake air filter by the filter maintenance monitoring method as mentioned in any one of the first to the eighth inventions. That is, the filter used as the gas turbine intake air filter is appropriately maintained by any one of the first to the eighth inventions. Hence, the wash of this filter is done corresponding to the predetermined situations of use and removal of the foreign matters in the air can be efficiently done so as to contribute to the efficient operation of the gas turbine, thereby realizing a cost reduction and a contribution to the global environment preservation and resource saving.

The invention claimed is:

1. A gas turbine intake air filter monitoring method for a plurality of gas turbine intake air filters, comprising the steps of:

attaching an identification object having a coded information to each of said filters;

storing a history data base in a storage portion of a computer, said history data base comprising wash history data and repair history data as a recycle history of said identification object of each of said filters;

renewing said history data base based on said wash history data of each of said filters recovered after a predetermined use to be washed for re-use; and automatically judging a decision for re-use of each of said filters based on said history data base by a computer means stored with a predetermined filter re-using standard, wherein said repair history data includes information of a replacement of a filter cloth.

2. A gas turbine intake air filter monitoring method as claimed in claim 1, wherein the recovery of said filter is done after the predetermined use by a filter user using said filter on lease from a filter owner.

* * * * *